Aug. 18, 1931.  P. C. WARD  1,819,489
CONTROL SYSTEM
Filed Dec. 7, 1928   3 Sheets-Sheet 1

Fig. 1.

INVENTOR
Patrick C. Ward.
BY
ATTORNEY

Aug. 18, 1931.                    P. C. WARD                    1,819,489
                                CONTROL SYSTEM
                            Filed Dec. 7, 1928           3 Sheets-Sheet 3

INVENTOR
Patrick C. Ward.
BY
ATTORNEY

Patented Aug. 18, 1931

1,819,489

UNITED STATES PATENT OFFICE

PATRICK C. WARD, OF HOMEVILLE, PENNSYLVANIA

CONTROL SYSTEM

Application filed December 7, 1928. Serial No. 324,543.

This invention relates generally to control systems, and more particularly to control systems for machine tools such as shapers, planers and the like.

It has been common practice to utilize a motor for actuating the cutting tools of shapers and planers, etc., to perform feeding operations and the mechanism interposed between the motor and the cutting tool has always been made adjustable to permit an operator to make the adjustments required to obtain any desired feeding operation. In order to provide an adjustable drive between the feeding motor and the cutting tool, the mechanism necessarily includes a number of members movable relative to one another.

In the operation of such tool mechanisms, many of the members such as the pawl-and-ratchet members are subjected to great strains and under unexpected working conditions break down. Therefore, the feeding mechanisms heretofore provided for planers and shapers and the like have been found to be unsatisfactory because their structures are complicated and subject to break down upon the development of excessive strains.

In the present invention the movements of the cutting tool are controlled by controlling the feed motor, and this permits a simple and durable direct drive between the feed motor and the tool. Therefore with a durable direct drive between the motor and tool when an unexpected load is developed the only thing that happens is that the motor is stalled.

The object of my invention, generally stated, is to provide a control system for machine tools which shall be simple, and efficient in operation, and which may be economically manufactured and installed.

A more specific object of my invention, is to provide for controlling the tool-feeding operations of a shaper by controlling the operation of the feed motor.

A further object of my invention is to provide for controlling the operation of a tool-feeding motor so that the tool may be stopped at definite predetermined positions without resorting to the use of a manually-adjustable mechanical-feed-mechanism.

Another object of my invention is to provide for controlling the tool feed operation of a shaper, to effect definite movements of the cutting tool, by regulating to a high degree of accuracy the number of revolutions of the feed motor for each operation.

Another object of my invention is to provide for definitely controlling the number of revolutions of a tool feeding motor, by means automatically responsive to different load conditions.

Another object of my invention is to provide for controlling the movements of a gravity-influenced relay plunger, by changing the area of the inlet opening to control the admission of the fluid.

Other objects of my invention will be evident from the following description taken in conjunction with the drawings in which.

Referring now to the drawings, the reference character 1 designates generally a portion of a shaper to which my invention may be readily applied. It will be observed that the shaper shown is of the usual construction, comprising a cutting ram 2 carried by a saddle member 3. The vertical feeding movements of the saddle are guided by an upright frame member 4 which supports a stationary feed screw 5. The saddle 3 may be connected to the feed screw in any suitable manner, and in this embodiment of the invention, a feed nut 6 is rotatably mounted in the saddle member and disposed to make threaded engagement with the feed screw 5.

The structure of the shaper shown in the drawings departs from the usual design in that the feeding mechanism which connects the feed nut 6 with the feed motor is greatly simplified.

As illustrated the feeding movements of the ram 2 may be controlled by driving the feed nut 6 direct from a suitable feed motor, through a simple shaft and gear arrangement, shown generally at 7. Therefore a feed plate and ratchet device constituting a mechanical feed controlling device need not be utilized for definitely controlling the degree of feed, as will be explained in detail hereinafter.

In this embodiment of the invention, a direct-current feed motor 8, provided with a shunt field winding 9, and a series field winding 10, is utilized for actuating the feed nut 6, as shown. Manually operable line switches, 11 and 12, and reversing switches 13, 14, 15 and 16, are provided for controlling the operation of the feed motor.

In accordance with the usual practice, a main motor 17 is provided for actuating the cutting ram 2, to perform cutting operations. In this instance, a direct-current motor, provided with a shunt field winding 18, and a series field winding consisting of two separate sections, 19 and 20, respectively, is utilized. Manually-operable line switches 21 and 22, and directional switches 23, 24, 25 and 26, are provided for controlling the operation of the main motor 17.

Figure 2:
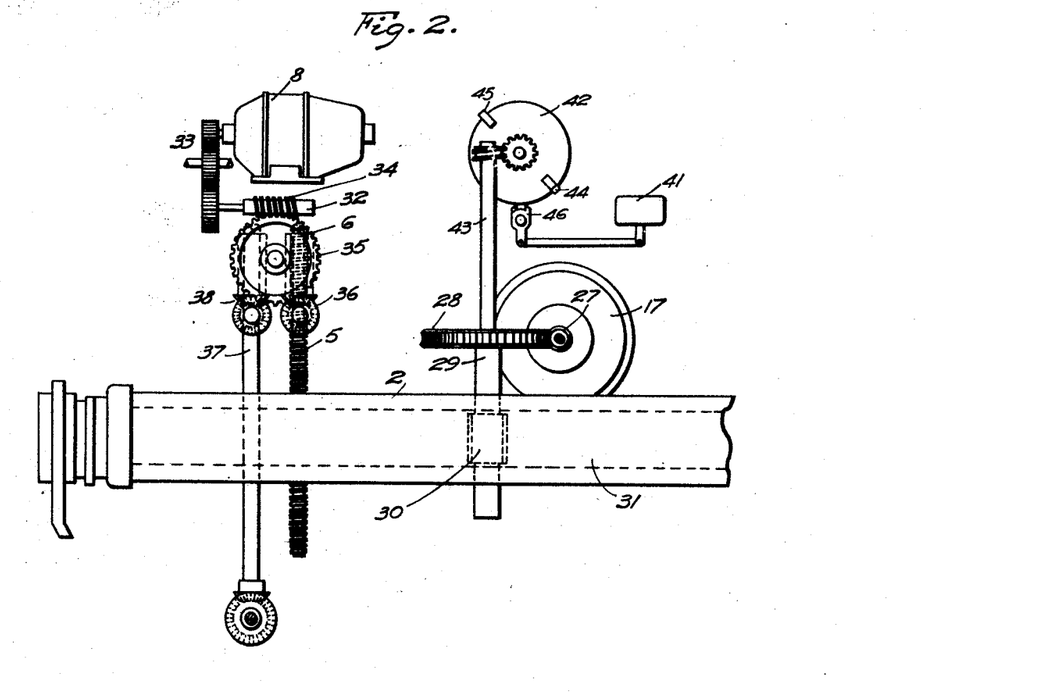
Fig. 2 is a diagrammatic view showing the mechanical features of the main drive, and feed mechanism, of a shaper to which my invention may be readily applied.

Referring to Fig. 2 it will be observed that the main motor 17 is connected to drive the ram 2 through a worm 27, secured to the motor shaft. As shown the worm meshes with a worm wheel 28 secured to the pinion shaft 29. The drive pinion 30 which is carried on the pinion shaft 29 is disposed to mesh with a rack 31, provded on the main body portion of the ram 2.

Figure 1:
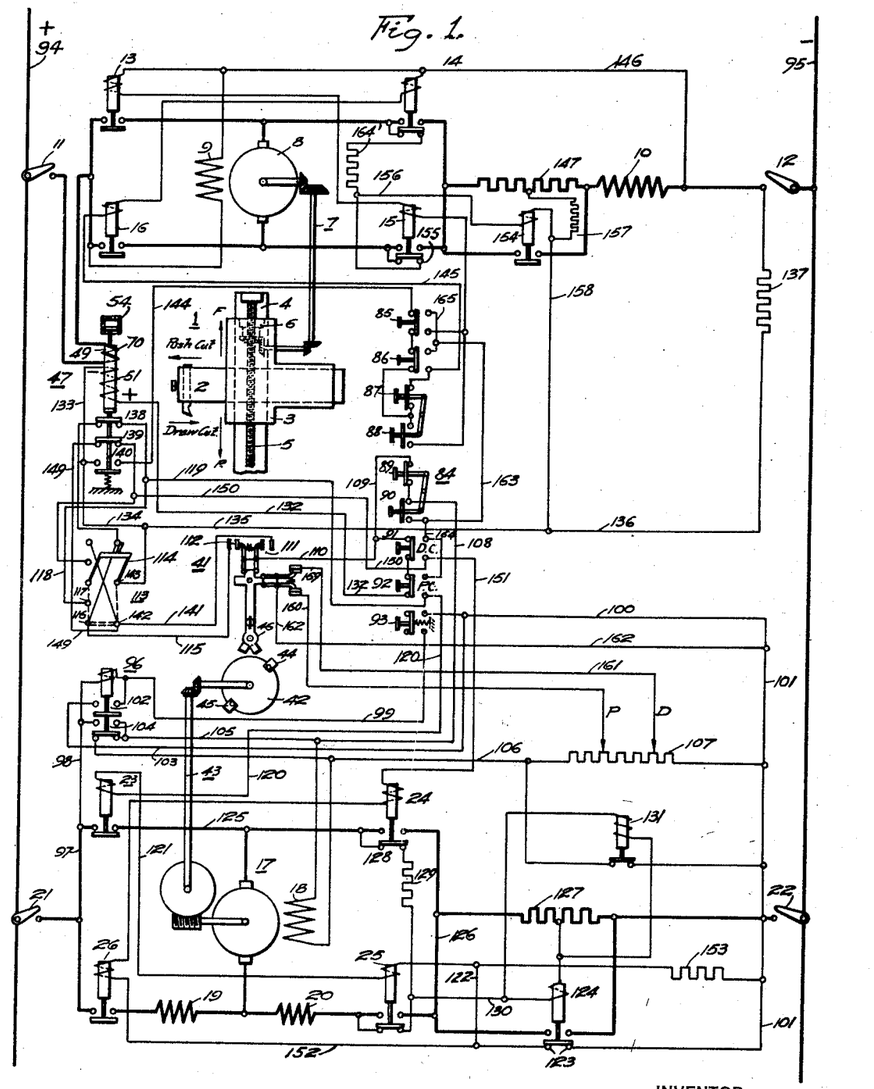
Figure 1 is a diagrammatic view of a control system for machine tools and particularly shapers embodying the features of my invention.

In Fig. 2, the features of the feed mechanism are shown in greater detail than in Fig. 1. As will be observed the feed motor 8 is connected to a worm shaft 32 by means of a gear train 33. A worm 34 on the shaft 32 meshes with a worm wheel 35 which may be utilized to drive the feed-nut for effecting vertical feeding movements of the cutting tool, or to drive the feed screw 37 for effecting horizontal feeding movements.

In this instance, the worm wheel 35 may be connected to the feed nut 6 which effects the raising or lowering of the ram 2, by means of a simple gear clutch 36. In a similar manner the shaft 37 which actuates the traversing mechanism may be connected to the worm wheel 35 by means of a gear clutch 38. Therefore, it is evident that the feed motor 8 may be readily connected for performing vertical or horizontal feeding operations, by a simple adjustment of the gear clutch members 36 and 38.

Since the mechanical features of the feed mechanism form no part of this invention, a further detailed description is deemed unnecessary. In considering and describing the control system, particularly as it relates to the feeding operations, it is only necessary to bear in mind that the adjustment of the cutting ram 2, to vary the degree of feed, is directly responsive to the operation of the feed motor, that is, for each revolution of the feed motor, there is a definite movement of the saddle member 3 in either an upward, downward, or side wise direction. In performing a quick traversing operation, the feed motor is operated continuously in one direction until the operation has been completed and, therefore, definite control other than starting and stopping of the feed motor is unnecessary.

In order to control the operation of the main motor 17 in accordance with the movements of the cutting ram 2, a master switch, designated generally, at 41, is provided. The operation of the master switch 41 is effected in the usual manner by utilizing a rotating disk 42, which may be actuated by the main motor 17 through a suitable drive mechanism, designated generally, at 43. The disk 42 is provided with a plurality of adjustable dogs 44 and 45 which are disposed to be actuated into engagement with the switch actuating lever 46 upon rotation of the disk 42 in a manner to effect the opening or closing of the master switch 41.

In order to control the operation of the feed motor 8, a time element relay, shown generally, at 47 in Fig. 1 is provided.

Figures 3, 4, 5:
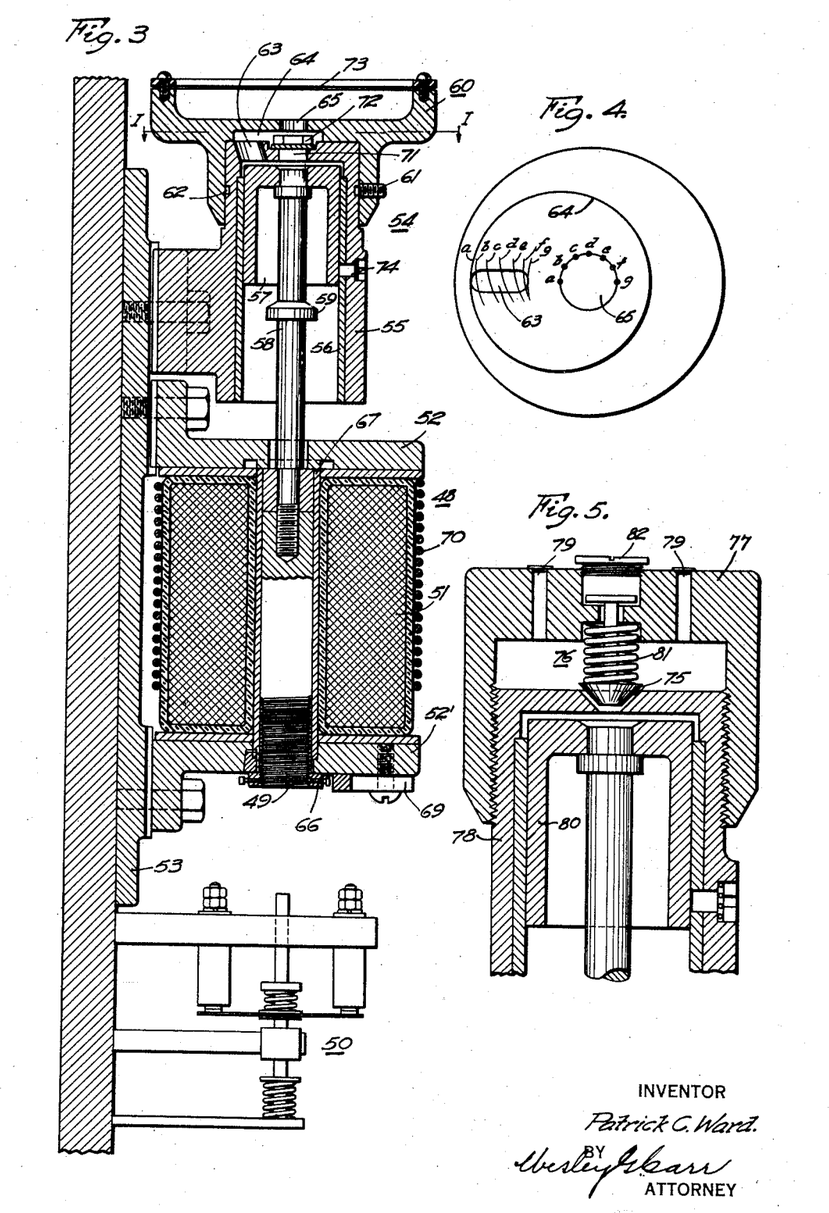
Fig. 3 is a vertical sectional view of my improved time-element relay which is shown diagrammatically in Fig. 1.
Fig. 4 is an enlarged sectional view taken along the lines I—I of Fig. 3, showing in detail, the outlines of the intake, and exhaust orifices in the dash pot, and the manner in which the movement of the adjustable cap member varies the effective area of the intake orifice.
Fig. 5 is a vertical sectional view showing a modification of the dash pot shown in Fig. 3.

As shown, in Fig. 3 the relay comprises an electromagnet 48, having a movable core or plunger 49, which may be utilized to effect the opening of a circuit controlling switch 50. In this instance only a single-contact switch has been shown, but it will be readily understood that as many contact members may be provided on the switch 50 as may be required for performing the necessary control operations. The electromagnet 48, in addition to the movable plunger 49, comprises an operating coil 51, which may be energized to actuate the plunger 49 to the raised position as shown. The operating coil 51 may be of the usual form-wound type, supported in the position shown, by means of metal brackets 52 and 52', which are bolted to the base member 53, in any suitable manner.

In order to provide for controlling the time required for the relay plunger 49 to fall from a raised position as shown in the drawings, to a point at which the switch 50 is actuated in response to the deenergization of the operating coil 51, a dash pot 54 generally is utilized. It will be readily understood, that, since the plunger 49 when released by the coil 51 is influenced by the force of gravity alone, the time element will depend upon the weight of the plunger and the distance it must fall to the full open position. Without any dash pot or retarding means exerting a restraining force in opposition to the force of gravity a minimum time element is obtained which, in most instances, is of too short a duration to be of any practical value.

In this embodiment of the invention, the dash pot 54 is so arranged that the time element of the relay may be readily adjusted between relatively wide limits. As shown, the dash pot 54 comprises a cylinder member 55 which may be secured to the base member 53 in any suitable manner. The bore of the cylinder 55 is provided with a liner 56 which is adapted to receive a piston member 57. The piston 57 is preferably formed of the same material as the liner 56, and may be fitted to the bore with considerable clearance for a purpose which will be described in detail hereinafter.

As shown, the piston 57 is connected to the plunger 49 by means of a suitable connecting member 58.

In order to limit the downward travel of the plunger and piston, the connecting member 58 is provided with a shoulder portion 59, which in its lower position engages the upper bracket member 52. As will be readily understood the upward movement of the plunger and piston is limited by a shoulder portion formed by the upper end of the plunger 49 which is disposed to engage the upper bracket member 52, as shown.

In order to control the operation of the dash pot 54 to vary the length of the time element from minimum to maximum values, the dash pot is provided with a rotatable-cap member 60, as shown. The cap member 60 rests firmly upon the top of the dash-pot cylinder 55, and is held in position by means of a set screw 61 which engages a groove 62 extending circumferentially around the outside periphery of the cylinder 55.

In order that a control fluid such as air, may be drawn into the cylinder in response to the downward movement of the piston 57, the cylinder top is provided with an elongated intake orifice 63. As shown the intake orifice 63 communicates between the interior of the cylinder 55, and the outside air through a passage comprising a recessed portion 64 in the face of the cap member 60 and a central opening 65.

Referring to Fig. 4, it will be observed that the recessed portion of the cap member 60 is of circular shape, and positioned eccentrically, with respect to the center of the cap. It will be readily understood that the effective area of the intake orifice 63 may be varied, by rotating the cap member 60 to the various positions designated as $a$ to $g$, inclusive, as shown. Due to the eccentricity of the recessed portion 64, very small changes in the effective area of the intake orifice may be obtained by rotating the cap member 60, which provides for a fine and accurately controlled adjustment of the time element of the relay.

In describing the operation of the relay it may be assumed that the operating coil 51 is energized. In this instance the plunger 49 is held in the "up" position, as shown. When the plunger is released by the coil 51, the force of gravity immediately effects its movement in a downward direction. Consequently the dash-pot piston 57 is pulled downwardly and creates a partial vacuum in the cylinder 55. In accordance with a well known principle; the control fluid which is preferably of gaseous nature such as air is caused to flow into the cylinder through the central opening 65, passage 64, and intake orifice 63.

It will be readily understood, that the restraining force exerted upon the plunger 49, by the piston 57, will depend upon the rate with which air enters the dash-pot cylinder 55. Since the size of the intake orifice 63 may be readily adjusted, it is evident that the rate with which air enters the cylinder, and consequently the restraining force exerted by the piston, against the force of gravity, may varied to provide the desired time element by adjusting the cap member 60 in the proper position as described in detail hereinbefore.

As stated hereinbefore, a definite amount of clearance may be provided between the piston 57, and the cylinder liner 56, in order that a certain amount of air may escape from the cylinder thorugh the cylindrical passage thus formed. It will be readily understood that the air in this passage, provides an air cushion between the piston, and the cylinder walls, and functions in many respects as a lubricant.

It will be evident that the air cushion thus formed performs a function which would not be possible to obtain from the use of an ordinary lubricant, since the viscosity of any lubricant necessarily varies in accordance with temperature conditions, causing an appreciable variation of the friction force. Furthermore, the absence of lubricant in the dash-pot cylinder prevents the collection of dust particles, which, if allowed to remain and collect upon the cylinder walls, would seriously interfere with the accurate adjustment and operation of the relay.

In some instances, auxiliary means for controlling the time element of the relay may be required, when even the smallest movement of the cap member 60 effects too great a change in the time element. In order to provide for an auxiliary adjusting means, provision is made for varying the total distance which the plunger must fall when released by the coil 51, thus interposing a distance time element upon the time element produced by the dash pot 54. In this instance the distance time element may be controlled by utilizing an adjusting nut 66, which is disposed to engage a threaded portion of the plunger 49 as shown. It will be readily understood that the adjusting nut 66 is disposed to engage the lower bracket member 52' and thereby limit the upward movement of the plunger.

In order to prevent the plunger 49 from binding and sticking against the metallic coil liner 67, provision is made for controlling the distribution of the flux in the magnetic circuit of the relay. If the flux distribution in plunger 49 is not uniform for any horizontal section, or at least so distributed that the flux of greatest density is substantially coaxial with the plunger, the plunger, being of paramagnetic material, will be attracted against the liner 67 and thus caused to stick. As shown, this function is performed by utilizing a plate 69 of paramagnetic metal, which may be adjustably secured to the bottom side of the lower bracket 52, in any suitable manner to vary the flux distribution as desired.

In some instances, the intake orifice 63 may be nearly closed to provide a relatively long time element. Accordingly the upward movement of the piston member 57, in response to the coil 51, compresses the air contained in the dash pot cylinder 55 and establishes a back pressure which may interfere with the resetting operation of the relay. In order to provide for reducing the pressure set up by the piston 57, the cylinder head is provided with an exhaust port 71, which is controlled by a suitable check valve 72. As will be readily understood, the pressure of the air inside the dash pot cylinder 55 raises the check valve 72, permitting the air to escape to the outside, through the passage formed by the recess 64 and central opening 65.

In order to prevent dust particles and other foreign matter from being carried into the dash pot chamber by the air which enters the cylinder upon the down stroke of the piston 57, the cap member 60 is provided with a screen 73, as shown.

It will be observed that a passage 74 is provided in the dash pot cylinder 55 in a position directly above the top of the piston 57, when in its lowermost position. This port provides for quickly releasing the piston when it is near its open position, and insures that the plunger 49 will always drop to the full open position to effect the operation of the switch 50.

It will be readily understood that the design of the dash pot 54 as shown in Fig. 3 may be changed to effect the control of the intake fluid in various other ways, such for example, as shown in Fig. 5. It will be observed, that this modification is the same as that shown in Fig. 3, with the exception, that the cylinder head is provided with a single conical-shaped port 75, which is controlled by means of a spring-biased valve 76, supported and controlled by the cap member 77. In this instance, the size of the intake orifice may be varied by rotating the cap member 77, which is in threaded engagement with the dash pot cylinder 78, as shown. A plurality of screened air passages 79 are provided in the top of the cap member 77 for permitting air to flow into the dash pot cylinder in response to the suction created by the downward movement of the piston 80.

In the operation of the relay as shown in this modification, it will be readily understood, that the upward movement of the piston 80 compresses the air in the dash pot cylinder and effects the opening of the valve 76 which permits the escape of air quickly from the cylinder, through the passages 79, to the outside. The upward movement of the valve member 76 may be limited by means of a cap screw 82, as shown. When the piston comes to rest, the valve 76 immediately closes under the action of its biasing spring 81, and regulates the size of the intake orifice in accordance with the adjusted position of the cap member 77.

In order that a complete understanding of my invention may be had, the operation of the system, as shown in Fig. 1, will now be described in detail.

As is well known, shapers of the type illustrated are adapted to cut when the ram is traveling in either direction. For the purpose of explanation, it will be considered in this instance, that the shaper is set up to cut on the return stroke of the ram, to perform what is commonly known as a "draw-cut" operation. The position of the cutting tool may be reversed to cut on the forward stroke to perform a "push-cut" operation. As shown, the direction of movement of the cutting ram 2 is designated by arrows denoting "push cut" and "draw cut" directions, respectively. Therefore, it will be readily understood that the closure of the master switch 41 causes the main motor 17 to drive the cutting ram 2 in one direction and closure of the switch in the opposite direction effects the operation of the ram in the opposite direction.

As is shown, a pendant switch 84 comprising a plurality of push-button switches 85 to 93 inclusive is provided for controlling the various operations of the shaper. Since pendant switches of this type are well known, it is deemed sufficient to state that the various switch elements are combined in a single switch box, and suspended within easy reach of the operator.

In order to set the machine in operation, the line switches 11 and 12 may be closed to connect the feed-motor circuits to the source of current supply, which in this instance may be represented by line conductors 94 and 95. In like manner the line switches, 21 and 22, may be closed to energize the control circuits for the main motor 17.

In order to energize the master switch 84, the reset push button 93 may be closed to effect the operation of a circuit energizing relay 96, which may also be utilized to deenergize the control system in response to the operation of any suitable over load device not shown. The operating circuit for the relay 96 may be traced from the line conductor 94, conductors 97 and 98, operating coil of relay 96, conductor 99, push button 93, conductors 100 and 101 and line switch 22, to the line conductor 95. Accordingly, upon the closure of relay 96, a holding circuit is established, extending from conductor 99, through contact members 102, and conductor 103 to thereby bridge the reset button 93, and retain the energizing relay 96 closed, after the button has been released.

The shunt field winding 18, of the main motor 17, is also energized through a circuit established by the closure of the contact members 104 of relay 96, which may be traced from the energized conductor 98, contact members 104, conductor 105, shunt field winding 18, conductor 106, and a field resistor 107 to the energized conductor 101.

The operation of the feed motor 8, and the main motor 17 may be controlled automatically, by the operation of the master switch 41 and time element relay 47 by actuating the pendant push button 89 to the closed or master-control position, as shown. They may also be controlled manually by actuating the pendant push button 90, to the closed or pendant-control position, which permits the feed or main motor to be started and stopped in response to the operation of the various push buttons, contained in the pendant switch 84. However, since the most important feature of the invention is included in the automatic part of the system, the automatic operation of the shaper will be described first.

Assuming that the push button switch 89 is closed, the closure of contact members 104 of the relay 96 also establishes an energizing circuit which extends from the energized conductor 98, through contact members 104, conductors 105, and 108, push-button switch 89, conductors 109 and 110, to the normally opened contact members 111 and 112, of the master switch 41. Assuming that the actuating lever 46 of the master switch 41 has been engaged by the dog 45 on the plate member 42, the master switch is then actuated so as to effect the closure of the contact members 112.

Since cutting operations may be performed when the cutting ram 2 is traveling in either direction, it is evident that the control of the feeding operation must be so arranged that a feeding operation will occur at the end of the push stroke, when a "draw cut" operation is being performed, and at the end of the draw stroke, when a "push cut" operation is being performed.

In order to provide for controlling the feeding operation in this manner, a double-throw transfer switch, designated generally at 113, is utilized. In this instance, the switch blades 114 are actuated to the position shown in dotted lines when a "draw-cut" operation is being performed, and to the opposite position for a "push-cut" operation. With the transfer switch 113 in the down position, the closure of the master-switch contact members 112 completes an energizing circuit for the main motor directional switches 23 and 25, which may be traced from the energized conductor 110, contact members 112 of the master switch 41, conductor 115, contact members 116 and 117, of the transfer switch 113, bridged by the left hand switch blade 114, conductors 118, 119 and 120, operating coil of the directional switch 23, conductor 121, operating coil of the directional switch 25, conductor 122, closed contact members 123 of a resistor controlling relay 124, to the energized conductor 101.

Upon the closure of the directional switches 23 and 25, an energizing circuit for the main motor 17 is established from the line conductor 94, through a line switch 21, conductor 97, switch 23, conductor 125, armature of the motor 17, series field winding 20, directional switch 25, conductor 126, series resistor 127 and line switch 22 to the line conductor 95.

The resistor controlling relay 124 may be of any suitable type. In this instance provision is made for controlling the relay in accordance with the counter-electromotive force of the motor. As shown its operating circuit is controlled by the back contact members of the directional switches 24 and 25. In this instance the directional switch 24 remains closed and the relay circuit thus established, extends from the upper armature terminal of the motor 17, back contact members 128 of switch 24, dynamic braking resistor 129, conductor 130, operating coil of relay 124 to the midpoint of the energized resistor 127. The bridging switch 124 then closes to bridge the resistor 127, in response to the establishment of a predetermined counter-electromotive force in the armature of the motor 17.

In order to provide a strong shunt field for quickly accelerating the main motor 17, a normally closed field-forcing relay 131 is provided for bridging the shunt field resistor 107. As shown, the operating coil of the relay 131 is connected in parallel relation with the operating coil of the relay 124, which likewise renders it responsive to the counter-electromotive force of the motor 17. Accordingly the relay is actuated to the open position to remove the bridging circuit from the shunt field resistor 107, when the counter-electromotive force of the motor rises to a predetermined value.

Concurrently with the closure of the push button switch 89, an energizing circuit for setting the time element relay 47, is established, which may be traced from the energized conductor 109, through push-button switches 91 and 92, conductor 132, operating coil 51 of the time-element relay 47, conductors 133, 134, 135 and 136, resistor 137, and line switch 12 to the line conductor 95. Consequently, the relay plunger 49 is raised to its upper position which permits the opening of the relay contact members 138 and 139, and the closure of contact members 140. In this instance, the contact members 138 and 139 are utilized to control the operation of the main motor directional switches, and contact members 140 are utilized to control the operation of the feed motor directional switches as will be described in detail hereinafter.

As will be readily understood, when the cutting ram 2 reaches the end of the push stroke the master switch 41 will be actuated to the opposite position thereby closing its contact members 111, and opening contact members 112. Upon the closure of contact members 111, a circuit is established from the energized conductor 110, contact members 111, conductor 141, contact members 142 and 143 of the transfer switch 113, conductor 134, contact members 140 of the relay 47, conductor 144, push button switches 87, 86 and 85, conductor 145, operating coils of the directional switches 16 and 14, conductor 146 and line switch 12, to the line conductor 95.

Upon the closure of the directional switches 16 and 14, an energizing circuit for the feed motor 8 is established which may be traced from the line conductor 94, through line switch 11, compensating winding 70 of the relay 47, switch 16, armature of the motor 8, switch 14, series resistor 147, series field winding 10 and line switch 12 to line conductor 95.

Accordingly the feed motor 8 is set in operation to actuate the saddle member 3, and cutting ram 2 in an upward or forward feeding direction. In this instance the push button switches, 87 and 88, are utilized for controlling the direction of feed. As will be readily observed, the opposite direction of feed may be obtained by actuating the push button switch 88 to the closed position, which interrupts the operating circuit for the "forward" directional switches 14 and 16, and establishes an operating circuit for the "reverse" directional switches 13 and 15.

In order that the feed motor may be accurately stopped after a predetermined number of revolutions, the time-element relay 47 is caused to function simultaneously with the starting of the feed motor. Therefore, it is evident that the main coil 51 of the time-element relay 47 must be deenergized at the same time the directional switches 16 and 14 are closed. In this embodiment of the invention, the deenergization of the coil 51 is effected by the closure of the master switch contact members 111. As described hereinbefore the pendant switch 84 is connected to the positive line conductor 94, and that the energizing circuit for the relay coil 51 extends through the pendant switch 84 and conductor 132 to the terminal of the coil designated as +. Therefore it is evident that the closure of the master switch contacts 111 which are also energized from the positive line conductor 94 impresses a voltage of the same polarity upon the terminal of the coil designated as — and, therefore, reduces its applied voltage to zero. Or in other words the coil is short-circuited by a circuit completed by the closure of the master switch 41.

The feed motor 8 continues to perform the feeding operation until the plunger 49, as controlled by the dash pot 54, opens the contact members 140, which effects the deenergization of the operating circuit for the directional switches 16 and 14.

During the time the feeding operation is being performed the main motor 17 is deenergized and, therefore, the cutting ram 2 is inoperative. In order to start the ram in the "draw-cut" direction upon the completion of the feeding operation, the control of the main motor 17 is also rendered responsive to the closing operation of the time-element relay 47. As described hereinbefore, the closure of the master switch contact members 111 causes the main motor 17 to actuate the cutting ram 2 in the "draw-cut" direction. However, in order to prevent the reversal of the ram before the feeding operation is completed, the final establishment of the energizing circuit for the main motor 17 is rendered dependent upon the closure of the contact members 139 of the time-element relay 47.

As shown when the relay 47 has completed its operation and stopped the feed motor 8, a circuit is established from the energized conductor 110 through contact members 111, conductors 141 and 149, contact member 139, of the time element relay 47, conductors 150 and 151, operating coils of directional switches 24 and 26, conductors 152 and 122 resistor 153 to the energized conductor 101. Upon the closure of the directional switches 24 and 26, the main motor 17 is started and accelerated in exactly the same manner as described hereinbefore.

As described hereinbefore, the energizing circuit of the feed motor 8 extends through the compensating coil 70, of the time-element relay 47, which, provides for maintaining the speed of operation of the relay and the speed of the feed motor 8, in a constant predetermined ratio. It will be readily understood, that under some operating conditions the load on the feed motor will vary from time to time even though the motor is performing the same operation. This variation in load is due to several causes, the most important of which are machine friction and unbalanced load. The friction load of the machine will vary in accordance with the temperature and other well known factors, while the unbalanced load is an inherent characteristic of the machine. It has been found that, by properly regulating the magnetic force exerted by the compensating coil 70 that, the time of operation of the relay may be synchronized with that of the feed motor 8. That is, if the operation of the feed motor is sluggish, caused from an excessive load the time element of the relay is lengthened, automatically, due to the restraining force exerted by the compensating coil, without changing the setting of the dash pot.

In this instance, the series resistor 147 in the feed motor circuit is utilized as a ballast resistor during all the feeding operations, and is controlled in the usual manner for accelerating the feed motor when performing quick traversing operations. The control of the resistor 147 for starting the motor is effected by means of a counter-electromotive force relay 154, which is disposed to function in the usual manner to bridge the resistor in response to the establishment of a predetermined counter-electromotive force in the motor. As shown, the relay operating coil may be connected across the armature terminals of the feed motor 8 by means of the normally closed back contact members of the directional switches 14 and 15.

In the event the directional switches 13 and 15 are closed to operate the feed motor in the forward direction, an operating circuit for the relay 154 is established from the lower armature terminal of the motor 8, through the back contact members 155 of switch 15, conductor 156, operating coil of relay 154, resistor 157, a section of the resistor 147, and switch 14 to the upper armature terminal. When the transfer switch 113 is in the down position as indicated by the dotted lines a positive potential is impressed upon the conductor 135, which is connected to the relay coil circuit between the coil and resistor 157, by means of conductor 158. Since the opposite terminal of the relay coil is always positively energized from the motor armature, it is evident that the coil is energized by a positive potential at both its terminals and, therefore, rendered ineffective.

When manual operation of the feed motor 8 is desired for performing traversing operations, the push button 90 is actuated which effects the opening of push button 89 and, therefore, removes the positive potential from the conductor 135 and permits the relay 154 to function in its usual manner.

Since it is desirable to operate the cutting ram 2 at a slower speed when making a cut-stroke and when operating in the return direction, provision is made for controlling the strength of the shunt field of the main motor 17 in accordance with the position of the master switch 41. As shown, the master switch 41 is provided with normally closed contact members 159 and 160, each of which are disposed to establish a shunt circuit around a section of the shunt field resistor 107. When the master switch is closed in the "push-cut" direction, that is, the contact members 112 are closed, the contact members 160 are open and the energizing circuit for the shunt field winding 18 extends from the line conductor 94, through the line switch 21, conductors 97 and 98, contact member 104 of the switch 96, conductor 105, field winding 18, conductor 106 through a section of the resistor 107 to the contact member of the rheostat designated as D, conductor 161, contact member 159, conductor 162, to the energized conductor 101. In this instance it will be observed, that the greater part of the resistor 107 is connected in the shunt field circuit, thereby weakening the field excitation and permitting the main motor 17 to operate at a higher speed.

When the main motor 17 is reversed in response to the operation of the master switch 41, the contact members 159 are open, while contact members 160 remain closed thereby shunting the greater part of the resistor 107 from the shunt field circuit, strengthening the field excitation and causing the main motor 17 to operate at a slower speed for performing a draw-cut operation. When a push-cut operation is to be performed, the position of the rheostat contact members P and D are reversed in order to obtain a slow ram speed on the cut stroke and a fast speed on the return stroke.

In the event that it is desired to control the operation of the shaper, manually, by means of the pendant switch 84, the push button 90 is closed which energizes conductors 163 and 164. As will be observed, conductor 163 is connected to a tie conductor 165 between the normally opened contact members of the push button switches 85 and 86 which may be termed the "forward" and "reverse" traversing buttons respectively. So long that either button is held in the downward position, a corresponding operation of the feed motor 8 will result, by which, relatively extensive movements or adjustments of the cutting ram 2 are obtained to perform what is known as a quick traversing operation.

As shown, the conductor 164 connects push button switches 91 and 92, which may be termed "draw-cut" and "push-cut" buttons, respectively, with the energized conductor 108. When either of these switches are actuated to their closed positions, the operation of the main motor 17 is effected to actuate the cutting ram in either the "push" or "draw" direction. As shown, a dynamic braking resistor 164' is provided for stopping the feed motor 8, after it has been deenergized by the operation of the time-delay relay 47. The dynamic braking resistor is controlled in a well known manner through the back contact members of the directional switches 14 and 15. In like manner the dynamic braking resistor 129 which effects the stopping of the main motor 17 and is controlled by the back contact members of the directional switches 24 and 25.

It may be stated in conclusion, that, while the illustrated example constitutes a practical embodiment of my invention, I do not wish to limit myself strictly to the exact details herein illustrated since modifications of the same may be made without departing from the spirit of the invention as defined in the appended claims.

I claim as my invention:

1. In a control system for a shaper provided with a motor operated ram, and tool-feeding mechanism, in combination, a feed motor for operating the tool-feeding mechanism, a source of power for the motor, a time-element relay for controlling the feed motor, a master switch disposed to be actuated synchronously with the operation of the ram for controlling the operation of the relay, said master switch being disposed to connect the feed motor across the source of power and to deenergize the relay, whereby the motor is deenergized a predetermined interval after it is started by the master switch.

2. In a control system for a shaper provided with a ram, and tool-feeding mechanism, in combination, a motor for operating the tool-feeding mechanism, a source of power for the motor, a time-element relay provided with an actuating coil for controlling the operation of the feed motor, a master-switch disposed to be actuated in accordance with the movements of the ram, said master-switch being disposed to control the energization of the relay coil, and to initiate the operation of the feed motor, whereby upon the closure of the master switch in a predetermined direction the feed motor is started and the relay coil short-circuited, simultaneously, to render the number of revolutions of the feed motor dependent upon the time-element of the relay.

3. In a control system for a shaper provided with a cutting motor operated ram and means for adjusting the ram, in combination, a motor for operating the adjusting means, a source of power for the motor, a master switch for controlling the operation of the motor, a time-element relay disposed to cooperate in the control of the motor, said relay having contact members connected in series relation to the master switch, and an actuating coil disposed to be deenergized by the master switch, and means for rendering the master switch effective to deenergize said relay in response to the movement of the ram operating motor, thereby to stop the motor after a predetermined number of revolutions as determined by the time-element relay.

4. In a control system for a shaper provided with a ram, and tool-feeding mechanism, in combination, a motor for actuating the ram, a feed motor for actuating the feeding mechanism, a source of power for the motors, a master switch disposed to be actuated in accordance with the movement of the ram, said master switch being disposed to effect a reversal of the ram motor at each end of the ram stroke, and to initiate the operation of the feed motor, a switch for selectively controlling the starting of the feed motor to effect a feeding operation at either end of the ram stroke, a time-element relay disposed to stop the feed motor within a predetermined time after it has been started by the operation of the master switch, said relay having an actuating coil disposed to become deenergized in response to closure of the master switch in a predetermined direction, thereby to effect a deenergization of the feed motor.

5. In a control system for a shaper provided with a ram and tool-feeding mechanism, in combination, a motor for actuating the ram, a feed motor for actuating the feeding mechanism, a source of power for the motors, a master switch disposed to be actuated in accordance with the movements of the ram, said master switch being disposed to effect a reversal of the ram motor at each end of the ram stroke and to initiate the operation of the feed motor, a switch for selectively controlling the starting of the feed motor to effect a feeding operation at either end of the ram stroke, a time-element relay disposed to stop the feed motor within a predetermined time after it has been started by the operation of the master switch, said relay having an actuating coil disposed to be deenergized in response to the closure of the master switch in a predetermined direction to effect a deenergization of the feed motor and means controlled by the time-element relay for delaying the reversal of the ram-actuating motor until a feeding operation has been completed.

6. In a control system for a shaper provided with a ram, and tool feeding-mechanism, in combination, a motor for actuating the ram, a feed motor for actuating the feeding mechanism, a source of power for the motors, a master switch disposed to be actuated in accordance with the movements of the ram, said master switch being disposed to effect a reversal of the ram motor to give the ram a reciprocating movement and to initiate the operation of the feed motor, a switch for selectively controlling the starting of the feed motor to permit a feeding operation at either end of the ram stroke, a time-element relay disposed to stop the feed motor within a predetermined time after it has been started by the operation of the master switch, said relay having an actuating coil disposed to be deenergized in response to the closure of the master switch in a predetermined direction to effect a deenergization of the feed motor, and a switch disposed to be actuated in response to the operation of the relay to cooperate with the master switch in the control of the ram motor, thereby to render the ram inoperative until the feeding operation has been completed.

7. In a control system for a shaper provided with a ram, and tool-feeding mechanism, in combination, a motor for operating the tool-feeding mechanism, a source of power for the motor, a master switch disposed to be operated in synchronism with the movements of the ram for energizing the motor, a time-element relay for deenergizing the motor subsequent to its energization by the master switch, said relay being provided with a voltage coil controlled by the master switch and a current coil disposed to be energized in accordance with the motor current, said current-coil being disposed to control the functioning of the relay, whereby the time-element of the relay is automatically varied to provide for operating the motor the same number of revolutions regardless of the load imposed upon the motor.

8. In a control system for a shaper provided with a ram, and tool-feeding mechanism, in combination, a main motor for operating the ram, a motor for operating the tool-feeding mechanism, a source of power for the motors, a master switch disposed to be operated by the main motor for controlling the direction of operation of the main motor, a time-element relay for controlling the operation of the feed motor, said time-element relay being dependent on the closure of the master switch for its opening operation, said master switch being disposed to cooperate with said time-element relay to set the feed motor in operation in a predetermined direction, whereby the feed motor is stopped after it runs a predetermined number of revolutions in either direction.

In testimony whereof, I have hereunto subscribed my name this 27th day of November, 1928.

PATRICK C. WARD.